United States Patent [19]

Enatsu

[11] Patent Number: 4,480,479
[45] Date of Patent: Nov. 6, 1984

[54] TONOMETER

[75] Inventor: Masayuki Enatsu, Tokyo, Japan

[73] Assignee: Kabushiki Kaisha Medos Kenkyusho, Japan

[21] Appl. No.: 452,933

[22] Filed: Dec. 27, 1982

[30] Foreign Application Priority Data

Dec. 28, 1981 [JP] Japan .................. 56-198775[U]

[51] Int. Cl.³ ............................................. G01L 7/06
[52] U.S. Cl. ....................................... 73/729; 73/386; 73/708
[58] Field of Search ................ 73/708, 386, 387, 729, 73/431, 707

[56] References Cited

U.S. PATENT DOCUMENTS 1,204,483  11/1916  Pilling .................................. 73/729
1,278,761  9/1918  Schneider ........................... 73/729

Primary Examiner—Donald O. Woodiel
Attorney, Agent, or Firm—Steinberg & Raskin

[57] ABSTRACT

A tonometer having a construction whereby thermal expansion or contraction of the material forming the tonometer casing will have substantially no influence upon the precision of measurement of the instrument. The tonometer comprises a casing, a bellows mounted in a bottom portion of the casing, a rod resting on the bellows adapted to be axially shifted as the bellows expands and contracts, a base plate mounted above the bellows in the main portion of the casing, and an amplifying mechanism including a pointer mounted on the base plate in operative association with the rod for swinging the pointer. The base plate includes at least one leg forming an extension thereof which is fixed with respect to the casing so that the leg or legs constitute the sole means by which the base plate is fixedly mounted with respect to the casing. The rod rests on the bellows at a position closely adjacent to a position at which the base plate is fixed with respect to the casing.

7 Claims, 8 Drawing Figures

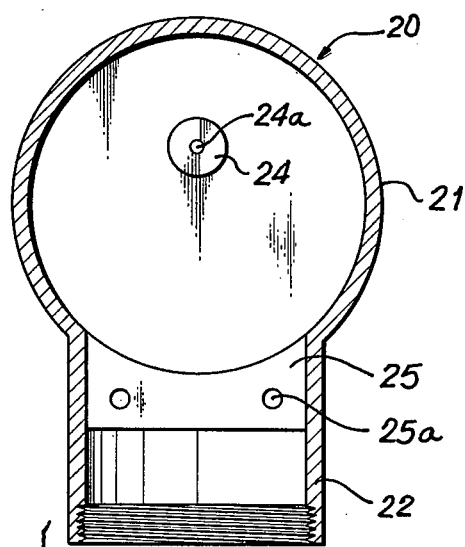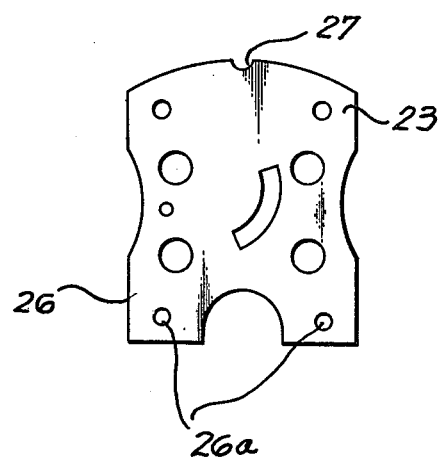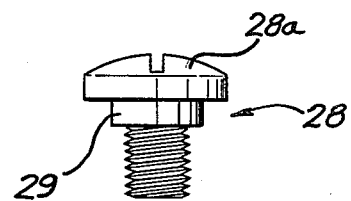

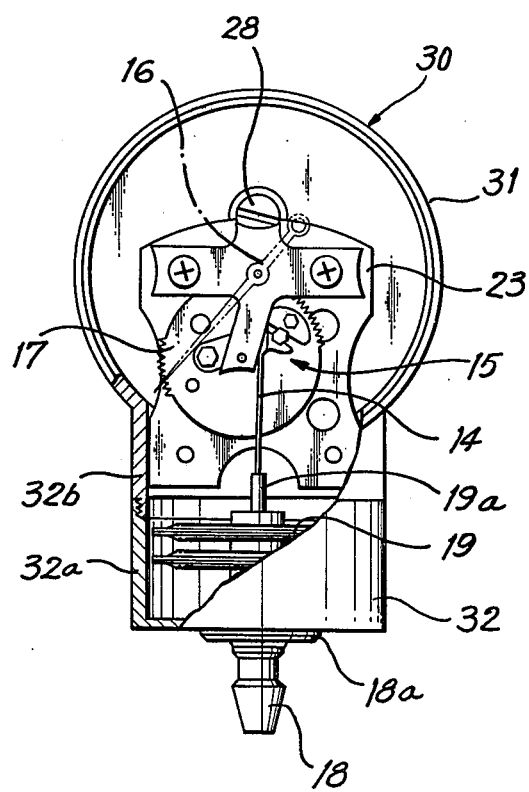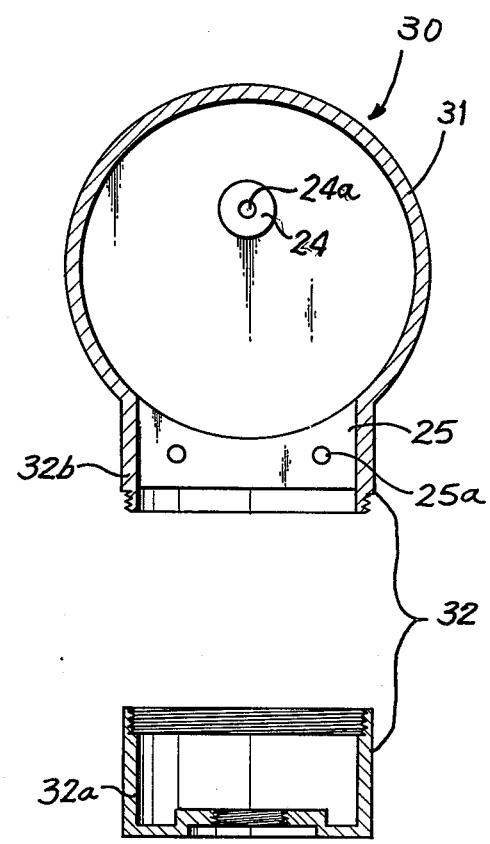

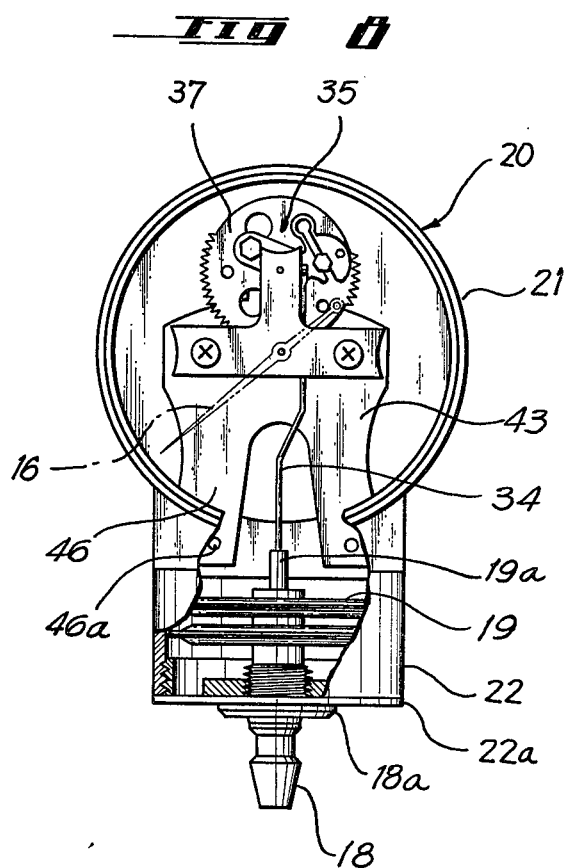

TONOMETER

BACKGROUND OF THE INVENTION

The present invention relates generally to tonometers of the aneroid type and, more particularly, to an improved aneroid tonometer wherein instrument error due to temperature variations is substantially eliminated.

The quality of measuring instruments in general, including tonometers, obviously is a function of the measuring precision of the instrument. In this connection, the term "measuring precision" is used not only to refer to the resolution of the instrument but, also, is understood to also comprise various factors such as the reliability and stability of the measurement value.

However, in the case of precision measuring instruments, such as the tonometer, it is known that the inner mechanism of the instrument is subject to being affected by environmental conditions, such as changes in temperature, humidity and atmospheric pressure, such changes in ambient conditions often causing serious errors in the value measured by the instrument. Thus, generally, precision measuring instruments are often subject to question regarding the reliability, stability, etc., of the measured value due to such environmental conditions.

The aneroid tonometer, the subject matter of the present invention, is particularly susceptible to instrumental error resulting from changes in ambient temperature since the respective components of the tonometer usually have different coefficients of thermal expansion. Such errors in measured values in aneroid tonometers is a well known problem and an urgent demand exists for the provision of an improved aneroid tonometer which is substantially free from instrumental error resulting from ambient temperature changes.

The construction of a well known prior art tonometer is illustrated in FIG. 1. Referring to FIG. 1, the prior art tonometer includes a nozzle portion 18 located in a lower portion of the instrument. The nozzle portion 18 is adapted to communicate with the object pressure to be measured. The object pressure is transmitted through the nozzle portion 18 to a bellows 19. For example, where the tonometer functions as a barometer, the object pressure comprises atmospheric pressure. The bellows 19 is expanded or contracted depending upon the pressure communicated thereto and thereby a pointer 16 is swung by a rod 14 and an amplifying mechanism 15 by an amount which corresponds to the change in expansion of the bellows 19.

The rod 14 has its lower end loosely inserted into a small diameter tubing 19a stationarily mounted in the upper central portion of the bellows 19 and resting in a non-fixed manner on the bottom of the tubing 19a.

The amplifying mechanism 15 includes a gear wheel 17 journaled on a base plate 13 and a pinion (not shown) integral and coaxial with a pointer 16 and adapted to mesh with the gear wheel 17. The gear wheel 17 is rotated through a predetermined angle as the rod 14 is axially shifted by the expansion or contraction of the bellows 19 to actuate the amplifying mechanism 15 and swing the pointer 16 a corresponding amount.

In the conventional tonometer illustrated in FIG. 1, the bellows 19 is mounted within a protruding bottom portion 12 of a casing 10 while the base plate 13 is mounted within a main portion 11 of the casing 10. The bellows 19 is fixedly connected with the nozzle portion 18 to the lowermost bottom wall 12a of the protruding bottom portion 12 of casing 10 by means of a ring nut 18a. The base plate 13 is fixedly connected centrally to the casing main portion 11 by means of a screw or similar threaded fastener 13a.

In the tonometer of the prior art illustrated in FIG. 1, however, the respective components described above are made of different materials. More particularly, the casing 10 is made of a material (usually of zinc die casting having a relatively high coefficient of thermal expansion) which is different from the materials of the base plate 13 and the rod 14. For this reason, the inherent zero point and sensitivity of the instrument will be altered when changes in the ambient temperature occur so that such temperature changes, in consequence, cause instrumental error.

Attempts have been made to overcome the problem described above. Thus, it has been proposed that the error resulting from ambient temperature changes can be reduced or eliminated by reducing the coefficient of thermal expansion of the casing 10 by molding the casing 10 of aluminum die casting having a relatively low coefficient of thermal expansion or by providing an inner structure comprising an integral frame-like casing formed of steel while the base plate, amplifying mechanism and other components are mounted within an outer frame formed of synthetic resin, such as plastic. Although this proposal has indeed reduced the thermal expansion of the casing and has correspondingly reduced the influence derived from the thermal expansion of the casing, this solution has not proven to be entirely satisfactory.

Moreover, use of the same material for all of the components of the tonometer in order to alleviate the problem of thermal expansion is not a practical solution. Thus, the types of materials from which the components of the tonometer can be formed is clearly limited by other factors, such as durability, performance and manufacturing cost. For example, zinc die casting which is suitable for molding and plating of the casing 10 is not especially suited for use in the construction of the other tonometer components.

SUMMARY OF THE INVENTION

Accordingly, it is a main object of the present invention to provide a new and improved aneroid tonometer having improved accuracy.

Another object of the present invention is to provide a new and improved aneroid tonometer wherein instrument error is reduced by reducing the influence that thermal expansion and contraction of the casing material has on the precision of measurement of the instrument.

It is also a principal object of the present invention to provide a new and improved aneroid tonometer wherein deviation from the zero point as well as the instrument's sensitivity to changes in the ambient temperature are reduced to a minimum substantially regardless of the type of material forming the casing.

Briefly, according to the present invention, these and other objects are attained by providing in a tonometer including a casing, a bellows mounted in the interior of a bottom portion of the casing, a rod resting on the bellows and adapted to be axially shifted by the bellows as the latter expands and contracts, a base plate mounted in the interior of the main portion of the casing, and an amplifying mechanism mounted on the base plate and actuated in operative association with the rod to swing a pointer by an amount corresponding to the extent to which the bellows expands or contracts, the improvement comprising that the base plate includes at least one leg means forming an extension thereof, the leg means being fixed with respect to the casing and with the leg means constituting the sole means by which the base plate is fixedly mounted with respect to the casing, and that the position at which the rod rests on the bellows is closely adjacent to the position at which the base plate is fixed with respect to the casing.

A preferred embodiment of the present invention has, in addition to the basic construction described above, a feature wherein the bottom portion of the casing which protrudes from the main portion thereof is formed of two portions, namely a bottom connector portion integral with the casing main portion and a separable bottom main portion in which the bellows are mounted and which is adapted to be connected to the bottom connector portion. The bottom connector portion extends from the casing main portion and terminates at a region which is proximate to the position at which the base plate is fixed with respect to the casing. Moreover, the separable bottom main portion is made of material having a coefficient of thermal expansion which is approximately equal to that of the bellows mounted therein. In this manner, the influence caused by the thermal expansion of the casing, although being slight in view of the basic construction according to the present invention, is even further reduced.

Another preferred embodiment of the present invention has, in addition to the basic construction described above, the further feature wherein at least the rod is made of material having a coefficient of thermal expansion which is higher than that of the base plate. In this manner, the influence caused by the thermal expansion of the casing, although being slight in view of the basic construction in accordance with the present invention as described above, is further offset by the thermal expansion difference of the rod and base plate.

DESCRIPTION OF THE DRAWINGS

A more complete appreciation of the present invention and many of the attendant advantages thereof will be readily understood by reference to the following detailed description when considered in connection with the accompanying drawings in which:

FIG. 3 is a front elevation view in section illustrating a casing used in a tonometer in accordance with the first embodiment of the present invention;

FIG. 4 is a front elevation view of a base plate for use in a tonometer in accordance with the first embodiment of the present invention;

FIG. 5 is a front elevation view of a male screw or a fastening element for restraining an upper portion of the base plate against lifting in a tonometer in accordance with the first embodiment of the present invention;

FIG. 6 is a view similar to FIG. 1 and illustrating a second embodiment of a tonometer in accordance with the present invention;

FIG. 7 is a view similar to FIG. 3 and illustrating a casing for use in a tonometer in accordance with the second embodiment of the present invention; and FIG. 8 is a view similar to FIG. 1 and illustrating a third embodiment of a tonometer in accordance with the present invention.

DESCRIPTION OF THE PREFERRED EMBODIMENTS

Figure 1:
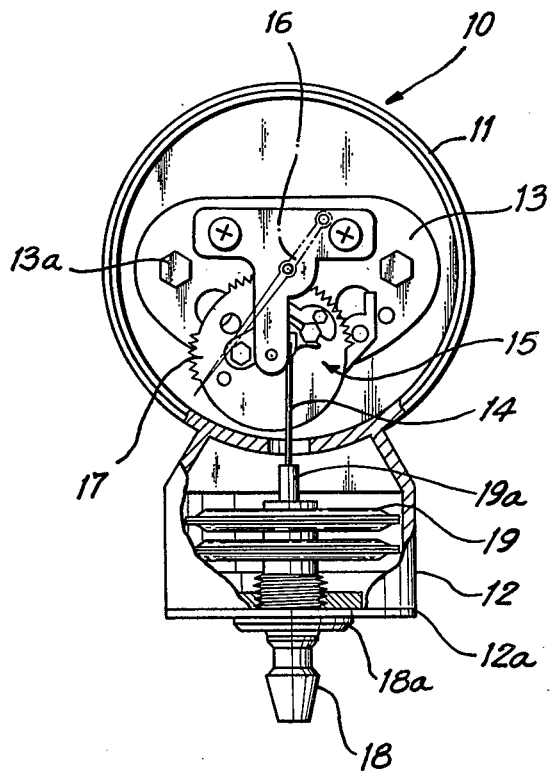
FIG. 1 is a front elevation view of a prior art tonometer illustrating the internal components thereof.
Figure 2:
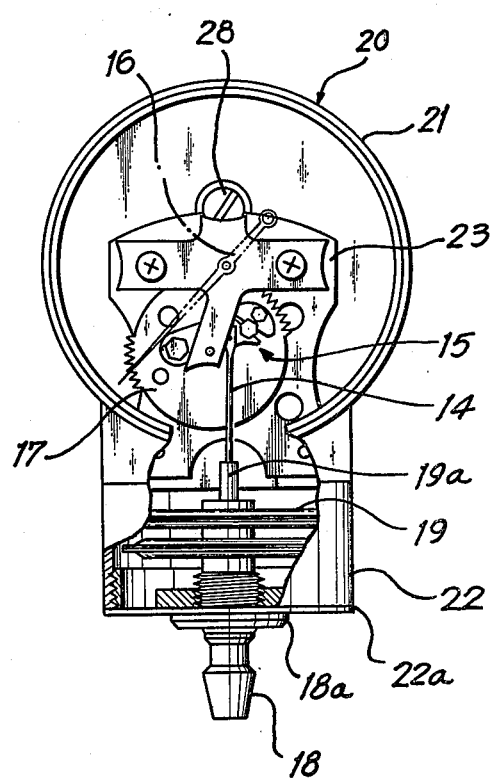
FIG. 2 is a view similar to FIG. 1 and illustrating a first embodiment of a tonometer in accordance with the present invention.

Referring now to the drawings wherein like reference characters designate identical or corresponding parts throughout the several views, FIGS. 2-5 illustrate the arrangement and components of a first basic embodiment of a tonometer in accordance with the present invention. Referring to FIG. 2, the tonometer includes a casing 20 in which a base plate 23 is mounted as described below. An amplifying mechanism 15 (including a hair spring, not shown) and a bellows 19 are mounted in the casing 20. The casing 20 is illustrated in FIG. 3 while the base plate 23 is illustrated in FIG. 4. The manner in which the bellows 19, rod 14 and amplifying mechanism 15 are operatively associated with one another is the same as in the case of the prior art tonometer discussed above so that a discussion of such operative interrelationships are not required at this point. The parts of the tonometer illustrated in FIGS. 2-5 which correspond to similar parts of the conventional tonometer illustrated in FIG. 1 are designated by the same reference numerals.

Referring to FIGS. 2 and 3, the casing 20 comprises a main portion 21 and a protruding bottom portion 22 formed integrally with the casing main portion without any partition therebetween. It should be noted that the term "bottom portion" is being used for purposes of simplicity to refer to any casing portion which protrudes from a main portion and is not necessarily limited to a portion which extends below a main portion. Thus, the tonometer may be oriented in any manner, i.e., with the so-called bottom portion extending laterally or even upwardly from the casing main portion.

A lowermost bottom wall 22a of the protruding casing bottom portion 22 is separately formed with respect to the casing 20 and is detachably attached to the bottom portion 22 by means of screw threads as shown. The bellows 19 is carried within the interior of the protruding bottom portion 22 and, in particular, is fixedly connected at a nozzle portion 18 to the bottom wall 22a through a central opening in the bottom wall by means of a ring nut 18a as in the case of the conventional tonometer illustrated in FIG. 1.

A central upper portion of the casing main portion 21 has a protruding seat 24 provided with a threaded bore 24a. The protruding bottom portion 22 of casing 21 is formed with a thicker portion 25, the top surface of which is substantially flush with the top surface of the seal 24. A pair of openings 25a are provided through the thicker portion 25 of the bottom portion 22.

The base plate 23 (FIG. 4) has a pair of legs 26 forming extensions of the base plate 23. As seen in FIG. 2, when the base plate 23 is mounted in the casing main portion 21, the pair of legs 26 extend into the interior of the protruding bottom portion 22 of the casing. The legs 26 of base plate 23 are provided with a pair of threaded openings 26a at positions which correspond to the positions of the openings 25a formed through the thicker portion 25 of the casing so as to align therewith when the base plate is appropriately situated within the casing. Moreover, an upper portion of the base plate 23, i.e., a portion of the base plate 23 which is opposed from the legs of the base plate, has a semi-circular notch 27 provided therein at a position corresponding to that of the threaded opening 24a formed in the seat 24.

When the base plate 23 is mounted within the casing 20, the pair of threaded openings 26a of the base plate legs 26 are aligned with the corresponding pair of openings 25a formed in the casing thicker portion 25. Male screws or threaded fasteners (not shown) of appropriate dimensions are inserted through aligned pairs of openings 25a, 26a to secure the base plate 23 with respect to the casing 20. More particularly, the screws are inserted into the openings 25a from their rear sides and are threaded into the corresponding threaded openings 26a. By rotating the heads of these male screws at the rear side of the casing 20, the base plate legs 26 are clamped by engagement of the male screws with the corresponding threaded openings 26a against the thicker portion 25 of the casing until the base plate 23 is secured to the casing 20. In this manner, the legs 26 of base plate 23 constitute the sole means by which the base plate 23 is fixedly mounted with respect to the casing 20.

However, a possibility remains that the upper portion of the base plate 23 might lift away from the casing 20. In order to restrain the base plate against lifting away from the casing, a male screw 28 (FIG. 5) is threaded into the threaded opening 24a formed in the seat 24 which, as noted above, is situated adjacent to the notch 27 formed in the upper portion of the base plate 23. The screw 28 is provided with a head 28a and a threaded shank having a step portion 29 formed therein below the head 28a. The step portion 29 has a radius of curvature which is less than the radius of curvature of the notch 27 while the axial thickness of the step portion 29 is slightly greater than the thickness of the base plate 23 at the portion thereof adjacent the notch 27. In this manner, when the base plate 23 is secured within the casing 20 and the screw 28 is fully threaded into the opening 24a until the step portion 29 abuts the upper surface of the seat 24, the upper portion of the base plate 23 will be restrained by the head 28a of screw 28 from lifting away from the casing beyond a predetermined amount. However, it is noted that the periphery of the notch 27 is not clamped or fixed between the head 28a of the screw 28 and the seat 24 but, rather, is free to move to at least a slight degree in the gap defined between the head 28a of screw 28 and the seat 24 by the step portion 29, even after the screw 28 has been fully threaded into the opening 24a. As a result, the base plate 23 is secured to the casing 20 solely and exclusively by its legs 26 and the periphery of the notch 27 is restrained against lifting but not clamped to the casing.

The difference in expansion or contraction of the casing 20 and the base plate 23 which occurs due to the changes in ambient temperature will be effectively compensated since the periphery of the notch 27 of the base plate 23 will slide within the space provided around the step portion 29 of the screw 28.

A second embodiment of a tonometer according to the present invention is illustrated in FIG. 6 in substantially the same condition as the tonometers illustrated in FIGS. 1 and 2. The casing 30 of the tonometer illustrated in FIG. 6 is illustrated in detail in FIG. 7. The manner in which the bellows 19, the rod 14 and the amplifying mechanism 15 are mutually related to each other and their operation is again similar to the case of the conventional tonometer. Moreover, the configuration of the base plate 23 and its manner of mounting within the casing 30 are the same as described above in connection with the first embodiment of the invention shown in FIG. 2 and, accordingly, a detailed explanation of these aspects is not required at this point. The components of the tonometer illustrated in FIGS. 6 and 7 which are similar to corresponding components of the first described embodiment are designated by the same reference numerals.

In the tonometer according to this second embodiment, the protruding bottom portion 32 of casing 30 comprises a bottom connector portion 32b formed integrally with the casing main portion 31 and a separate bottom main portion 32a. The bottom connector portion 32b terminates substantially in the lower end of the thicker portion 25 of casing 30 to which the base plate 23 is secured and is externally threaded at its lower edge for connection to the separable bottom main portion 32a which is similarly provided with an internally threaded portion.

In accordance with the second embodiment of the invention, the bellows 19 are mounted in the bottom main portion 32a and, moreover, the bottom main portion 32a is made of material having a coefficient of thermal expansion which is closely approximate to the coefficient of thermal expansion of the materials of which the bellows are made. For example, the bellows may preferably be formed of phosphor bronze so that the bottom main portion 32a will be formed of a material having a coefficient of thermal expansion closely approximate to that of phosphor bronze. The bellows 19 is fixedly connected to the bottom main portion 32a in the central opening formed in the bottom wall thereof in the same manner as in the conventional apparatus described above.

FIG. 8 illustrates a third embodiment of a tonometer in accordance with the present invention in substantially the same state as that illustrated in FIGS. 1, 2 and 6. Again, the components of the tonometer illustrated in FIG. 8 which are substantially the same as those in FIGS. 1–7 are designated by the same reference numerals.

In accordance with this embodiment, the rod 34 is made of material having a coefficient of thermal expansion higher than that of the base plate 43 so that any influence deriving from thermal expansion of the casing will be offset by a difference in thermal expansion between the rod 34 and the base plate 43.

For example, the casing 20 if formed of zinc die casting having a coefficient of thermal expansion of 27.4 to $27.7 \times 10^{-6}$, i.e., an identical material to that used in the first embodiment described above. The base plate 43 is secured at its legs 46 within the casing 20 by means of screws threaded into openings 46a formed in the legs 46. The bellows 19 are made of phosphor bronze having a coefficient of thermal expansion of 17.8 to $18.2 \times 10^{-6}$ and are situated within the protruding bottom portion 22 which is formed as a lower extension of the casing 20. It is noted that the casing 20 in the FIG. 8 embodiment has substantially the same construction as that of the embodiment illustrated in FIGS. 2 and 3. A gear wheel 37 of the amplifying mechanism 35 is journaled in the upper end of base plate 43 as opposed to the previously discussed embodiments wherein the gear wheels 17 were mounted in a more central region of the base plate. This necessitates that the rod 34 which links the bellows 19 with the amplifying mechanism 35 be longer than the rod 14 of the previous embodiments and offset as shown in FIG. 8 in order to avoid contact with a pinion (not shown) mounted concentrically with pointer 16. It is also noted that the base plate 43 as in the case of the previous embodiments, is fixedly mounted with respect to the casing 20 solely at the two legs 46 thereof, i.e., by threaded fasteners cooperating in openings 46a formed through the respective legs. According to another feature of the present invention, the rod 34 is made of material having a coefficient of thermal expansion which is higher than that of the base plate 43. In this manner any possible influence caused by the expansion or contraction of the casing 20, usually formed of zinc die casting, it being understood that such influence would be slight if any due to the use of the basic construction of the invention as illustrated in the previous embodiments, is even further reduced by the offset in expansions due to the difference of thermal expansion coefficients of the rod 34 and base plate 43. As an example, the base plate 43 can be made of cold rolled low carbon steel having a coefficient of thermal expansion of 10.5 to $11.6 \times 10^{-6}$ while the rod 34 can be made of brass having a coefficient of thermal expansion of 19 to $23 \times 10^{-6}$.

It will be readily understood that although the embodiment of FIG. 8 includes an amplifying mechanism 35 which is located at a position above the positions of the amplifying mechanisms of the previously discussed embodiments, and includes a rod 34 which is longer and has a somewhat different configuration than the corresponding rods of the previous embodiments, the actual location, length and configuration of these components will depend to at least some extent on the particular choice of materials available for the respective components. Therefore, it will also be readily understood that even when the configurations and locations of the various components, such as the base plate, amplifying mechanism and rod, are substantially as shown in the previously discussed embodiments, the beneficial effects of the feature of the present invention described in connection with FIG. 8, namely the effective offsetting of the influence derived from the expansion or contraction of the casing by providing a difference in thermal expansion coefficients of the rod and base plate as described above, will still be obtained. For example, the actuating mechanism and rod can have the configurations and locations of the previously discussed embodiments when the casing 20 is made of a material having a lower thermal expansion coefficient or the rod 34 is made of material having a higher thermal expansion coefficient.

According to another important aspect of the present invention, in all of the embodiments of the tonometer described above, the position at which the bellows 19 comes into contact and rests on the rod 14 or 34 is closely adjacent to the position at which the base plate 23 or 43 is fixed or secured with respect to the casing 20 or 30. In this manner, the influence deriving from the thermal expansion and contraction of the casing 20 or 30 upon the internal structure and components and, more particularly, upon the zero point and the sensitivity of the instrument as a whole, is substantially reduced with respect to the conventional apparatus illustrated in FIG. 1. It is noted that in the embodiments illustrated, this position is also closely approximate to the position at which the bellows 19 is fixedly connected to the casing 20 or 30.

As described above, the mounting of the base plate 23 or 43 on the casing 20 or 30 is preferably achieved simply by inserting threaded fasteners, such as screws, through the casing 20 or 30 from its rear side into engagement with corresponding threaded openings 26a or 46a formed in the base plate legs 26 or 46 in an extremely simple manner. Of course, the base plate can be mounted in other ways, for example, by inserting the threaded fasteners from the front side of the casing, etc.

Referring back to the second embodiment of the tonometer of the present invention illustrated in FIGS. 6 and 7, in addition to the previously described basic construction of the invention, i.e., wherein the base plate is formed with at least one leg forming an extension thereof and which constitutes the sole means by which the base plate is fixedly mounted with respect to the casing, the protruding bottom portion 32 of the casing 30 is formed in a divided fashion so as to include a bottom connector portion 32b integral with the casing main portion 31 and which terminates at a location in the region of which the base plate 23 is fixedly connected to the casing, and a separate bottom main portion 32a in which the bellows 19 are mounted, the bottom main portion 32a being made of material having a thermal expansion coefficient approximately equal to that of the bellows. These features themselves function to even further reduce any influence deriving from the thermal expansion of the casing, such influence, however, being slight due to the above-described basic construction according to the present invention.

The third embodiment of the tonometer according to the present invention has, in addition to the basic inventive construction, still another feature wherein the rod 34 is made of material having a coefficient of thermal expansion greater than that of the base plate 43 as described above. In this manner, any influence resulting from the thermal expansion of the casing, although being slight but possibly occuring even when the basic inventive construction is adopted, can be offset by the thermal expansion difference of the rod and base plate.

Obviously, numerous modifications and variations of the present invention are possible in light of the above disclosure. For example, the base plate can be formed with only a single leg rather than the pair of legs of the base plates of the illustrated embodiments, said sole leg constituting the sole means by which the base plate is fixedly mounted with respect to the casing. It is therefore to be understood that within the scope of the claims appended hereto, the invention may be practiced otherwise than as specifically disclosed herein.

What is claimed is:

1. In a tonometer including a casing defining an interior, said casing having main and bottom portions, bellows means mounted in the interior of said casing bottom portion, rod means resting on said bellows means adapted to be axially shifted by said bellows means as the latter expands and contracts, a base plate having a thickness mounted in the interior of said casing main portion, a pointer rotatably mounted on said casing, and amplifying means mounted on said base plate in operative assocation with said rod means for swinging said pointer an amount corresponding to a degree of expansion or contraction of said bellow means, the improvement comprising:

said base plate includes at least one leg means forming an extension thereof, said at least one leg means of said base plate being fixed with respect to said casing with said leg means constituting the sole means by which said base plate is fixedly mounted with respect to said casing, and wherein said rod means rests on said bellows means at a position closely adjacent to a position at which said base plate is fixed with respect to said casing.

2. The combination of claim 1 wherein said at least one leg means of said base plate has at least one opening formed therein and said casing has a corresponding number of openings formed therein at positions corresponding and adapted to align with respective openings formed in said base plate leg means, and wherein fastening means extend through pairs of aligned base plate and casing openings for fixedly mounting said base plate with respect to said casing.

3. The combination of claim 2 wherein said fastening means comprise threaded members adapted to be threaded in respective pairs of aligned base plate and casing openings.

4. The combination of claim 1 further including means for restraining a portion of said base plate opposed from said base plate leg means against lifting away from said casing beyond a predetermined amount while allowing said base plate portion to remain non-fixed to said casing.

5. The combination of claim 4 wherein said restraining means comprise: a notch formed at an upper portion of said base plate having a radius of curvature, a seat provided on said casing at a position corresponding to the position of said notch, said seat having a threaded bore formed therein, a threaded member having a head and a threaded shank having a step portion formed therein below said head, said step portion having a radius of curvature which is less than the radius of curvature of said notch and an axial length which is slightly larger than the thickness of said base plate in the region of said notch, and wherein said threaded member is threaded within said threaded bore, whereby the head of the threaded member restrains said upper portion of said base plate against lifting away from the casing beyond a predetermined amount, while allowing said base plate portion to remain non-fixed to said casing.

6. The combination of claim 1 wherein said bottom portion of said casing comprises a bottom connector portion integral with said casing main portion and a separable bottom main portion in which said bellow means are mounted adapted to be connected to said bottom connector portion, and wherein said bottom connector portion extends from said casing main portion and terminates at a region proximate to said position at which said base plate is fixed with respect to said casing, and wherein said separable bottom main portion is made of a material having a coefficient of thermal expansion which is approximately equal to that of the bellows means mounted therein.

7. The combination of claim 1 wherein at least said rod means is made of material having a coefficient of thermal expansion higher than that of the base plate so that an influence deriving from thermal expansion of said casing is offset by a difference in thermal expansion between said rod means and said base plate.

* * * * *

UNITED STATES PATENT AND TRADEMARK OFFICE
CERTIFICATE OF CORRECTION

PATENT NO. : 4,480,479
DATED : November 6, 1984
INVENTOR(S) : Masayuki Enatsu

It is certified that error appears in the above—identified patent and that said Letters Patent is hereby corrected as shown below:

Title page, delete:

'[73] Assignee: Kabushiki Kaisha Medos Kenkyusho, Japan"

The above patent is not assigned.

Signed and Sealed this

Thirtieth Day of April 1985

[SEAL]

Attest:

DONALD J. QUIGG

Attesting Officer     Acting Commissioner of Patents and Trademarks